United States Patent [19]
Baker et al.

[11] Patent Number: 5,864,687
[45] Date of Patent: Jan. 26, 1999

[54] ARINC 629 DATA RECEIVER SYSTEM HAVING AN INTERFACE FOR PROVIDING IDENTIFICATION TO EACH OF THE RECEIVED DATA WORD TYPES

[75] Inventors: Stephen M. Baker, Roseville; Randall Lynn Dodson, New Hope, both of Minn.

[73] Assignee: Honeywell Inc.

[21] Appl. No.: 681,133

[22] Filed: Jul. 22, 1996

Related U.S. Application Data

[63] Continuation of Ser. No. 99,793, Jul. 30, 1993, abandoned.
[51] Int. Cl.$^6$ ................ B41J 19/62; G06F 7/70
[52] U.S. Cl. ................ 395/309; 701/35; 711/101
[58] Field of Search ................ 395/428, 425, 395/872, 310, 309; 364/424.03, 424.04, 424.06; 701/35, 14; 711/101

[56] References Cited

U.S. PATENT DOCUMENTS

| | | | |
|---|---|---|---|
| 5,163,049 | 11/1992 | Smith et al. | 370/94.1 |
| 5,167,020 | 11/1992 | Kahn et al. | 395/250 |
| 5,260,874 | 11/1993 | Berner et al. | 364/424.03 |
| 5,261,058 | 11/1993 | Squires et al. | 395/275 |
| 5,274,773 | 12/1993 | Squires et al. | 395/275 |
| 5,404,548 | 4/1995 | Nishioka . | |

FOREIGN PATENT DOCUMENTS

| | | |
|---|---|---|
| 0429055 | 5/1991 | European Pat. Off. . |
| 0482963 | 4/1992 | European Pat. Off. . |

OTHER PUBLICATIONS

Boeing Arinc 629 Terminal Controller Universal Data Sheet, Revision C Master Dated Apr. 20, 1993.

IEE Coloquium on Time Critical Communications for Instrumentation and Control (Digest No. 122) pp. 5/1–2, 30 Oct. 1989, London UK J F Moore 'Arinc 629, The civil aircraft databus for the 1990's.

Primary Examiner—Tod R. Swann
Assistant Examiner—Hiep T. Nguyen
Attorney, Agent, or Firm—Charles J. Ungemach

[57] ABSTRACT

A memory interface system is operable with a ARINC 629 terminal controller for directing storage of data message received by the terminal controller into a memory device, and associating with each of the words stored in the memory device a tag word which identifies the word type being stored.

2 Claims, 13 Drawing Sheets

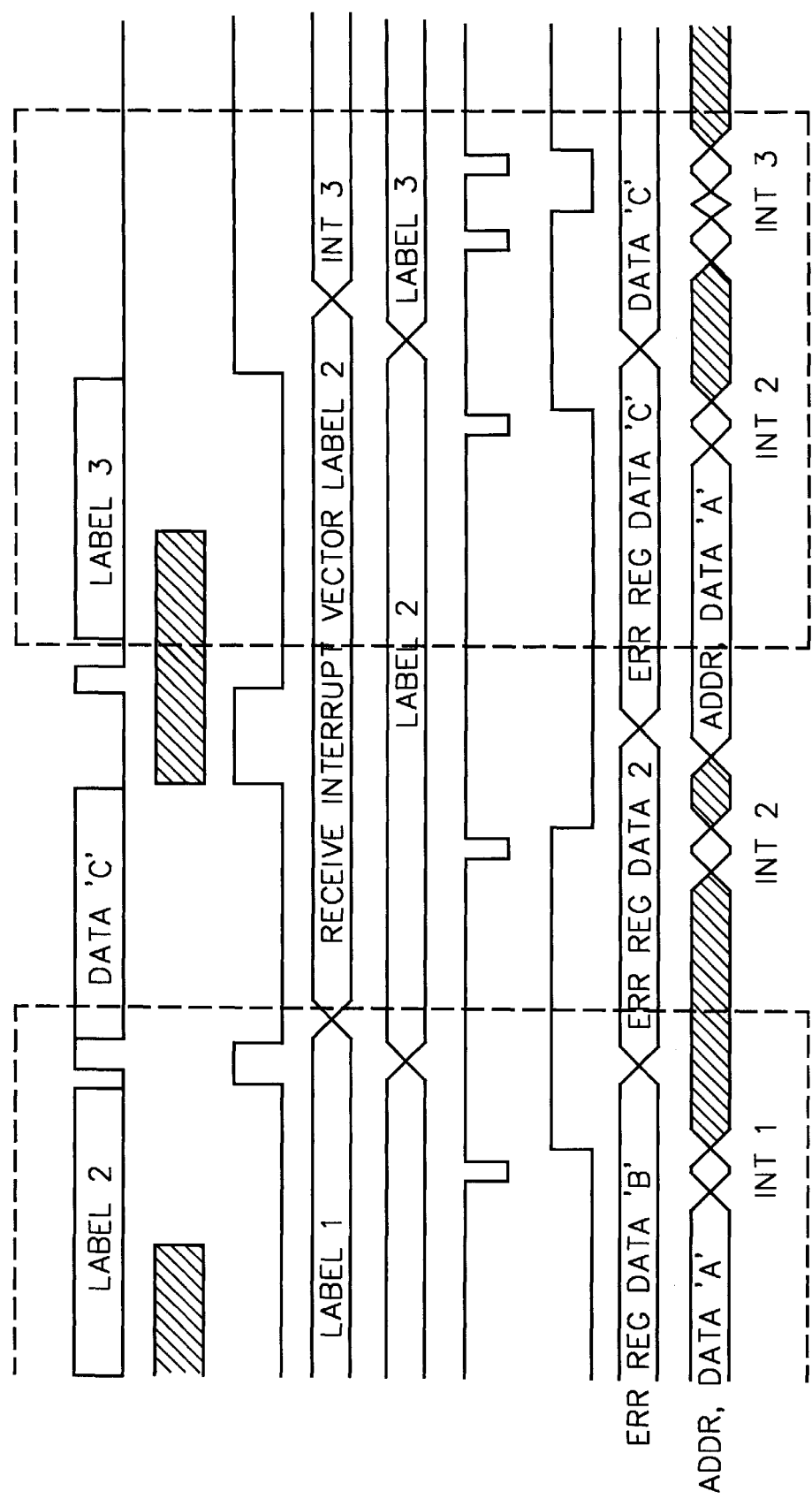

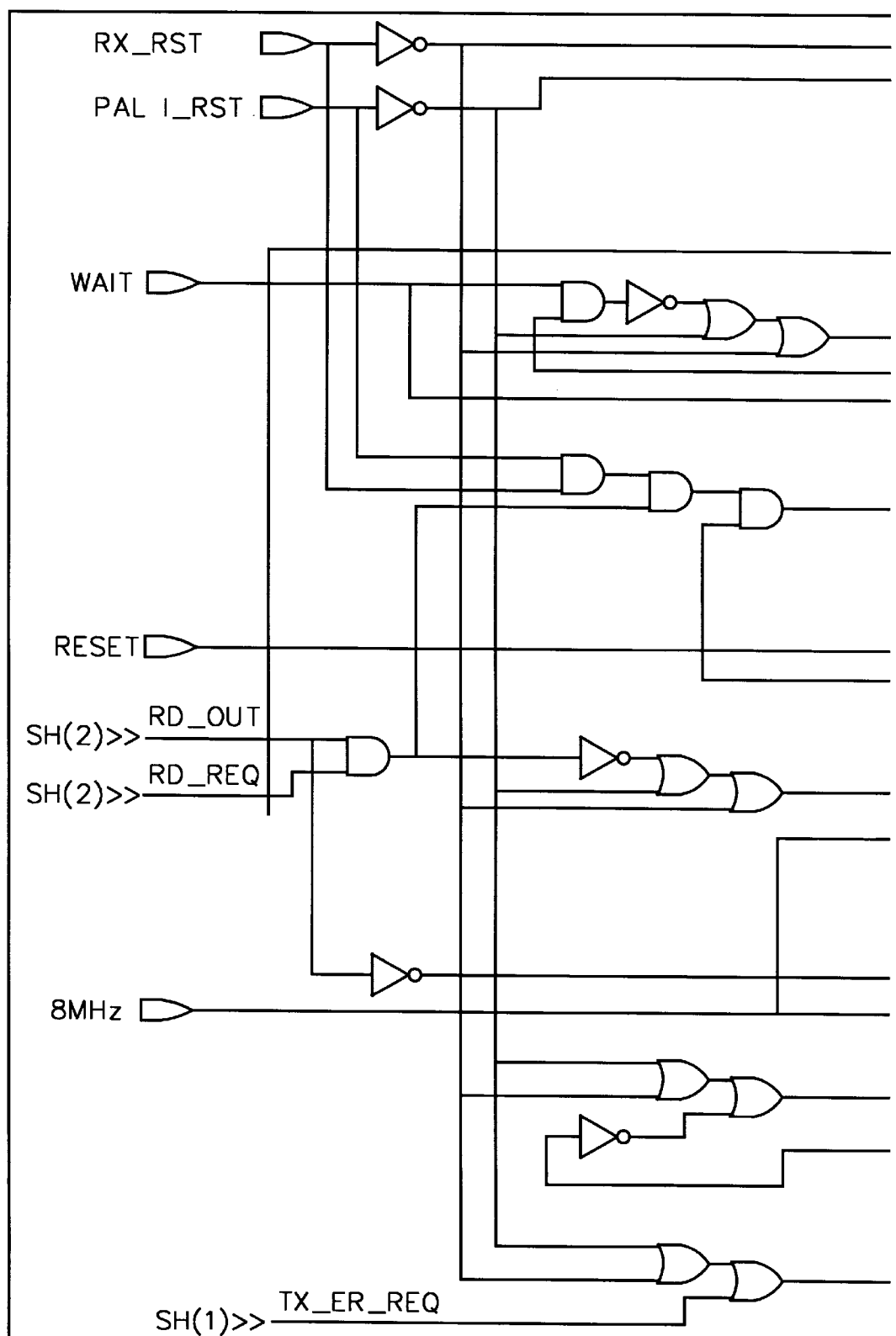
FIG.5a  READ/WRITE BLOCK 120

ARINC 629 DATA RECEIVER SYSTEM HAVING AN INTERFACE FOR PROVIDING IDENTIFICATION TO EACH OF THE RECEIVED DATA WORD TYPES

This application is a continuation, of application Ser. No. 08/099,793, filed Jul. 30, 1993, now abandoned.

BACKGROUND OF THE INVENTION

1. Field of the Invention

The present invention relates to serial data transmitter/receiver systems, and more particularly to a last word monitor system which cooperates with an ARINC 629 terminal controller.

2. Description of the Related Art

The operation of aircraft relies heavily on many electrical avionic subsystems for successful flight missions. These electrical subsystems include, among others, flight management, navigation, auto-pilot, global positioning systems, landing systems, fuel quantity systems, and the like. Many of these electrical subsystems require communications therebetween, and some sensing subsystems may be located remote from the processing subsystems. Since many of these subsystems may be provided by different manufacturers, standards have been defined for the transfer of data messages on data buses that are wired throughout the aircraft. One such standard is the ARINC (Aeronautical Radio Incorporated) 629 Standard.

The ARINC 629 Standard is such that each data message consists of a plurality of data words of fixed length, i.e., a fixed number of bits. Further, the data message format always consists of a label word, which indicates which subsystem transmitted the data message, followed by one or more data words. The ARINC 629 standard requires that each word be 16 bits and be transmitted at a fixed frequency.

In order to further define some commonality among avionics equipment suppliers, the ARINC 629 standard defines the bus and a Terminal Controller which is coupled to the bus for receiving data messages from the bus or transmitting data messages onto the bus. The ARINC 629 Terminal Controller is configured to have a known set of registers, input/output control signals, read/write control signals, and address/data lines, all of which are clearly defined so that avionic equipment suppliers may work together.

SUMMARY OF THE INVENTION

An object of the present invention is to provide a memory interface system for managing the flow of information from the terminal controller to a memory device for both the terminal controller receive mode and the terminal controller transmit mode.

In the present invention, a memory interface system is utilized for directing the storage of data messages received by an ARINC 629 terminal controller, wherein the terminal controller is coupled to a serial data bus for receiving data messages consisting of a plurality of words wherein the first received word is a label word representative of the origin of said data message, and subsequent words thereof are data words. The terminal controller includes a last word received register for the last received word, and an error register which stores data transmission/reception error information. The memory interface system comprising a first-in first-out memory means, means for cooperating with the terminal controller for reading the last word data register and for storing the data word, being the contents of said last word data register, into said memory; and means for reading the error register subsequent to reading the last word of the data message stored in the last word register, and for storing the error word, being the contents of said error register, into the memory; and means for associating with each the label words, data words, and error words stored in said memory a tag word in which the tag word identifies each stored word therein as being a selected one of the label words, data words, and error words.

BRIEF DESCRIPTION OF THE DRAWINGS

FIGS. 3A–3D are timing diagrams illustrating status signals of the ARINC 629 terminal controller for internal register timing for receive and transmit modes, respectively.

FIGS. 5A–5C are a schematic diagram illustrating an embodiment of a read/write block.

DESCRIPTION OF THE PREFERRED EMBODIMENT

Figure 1:
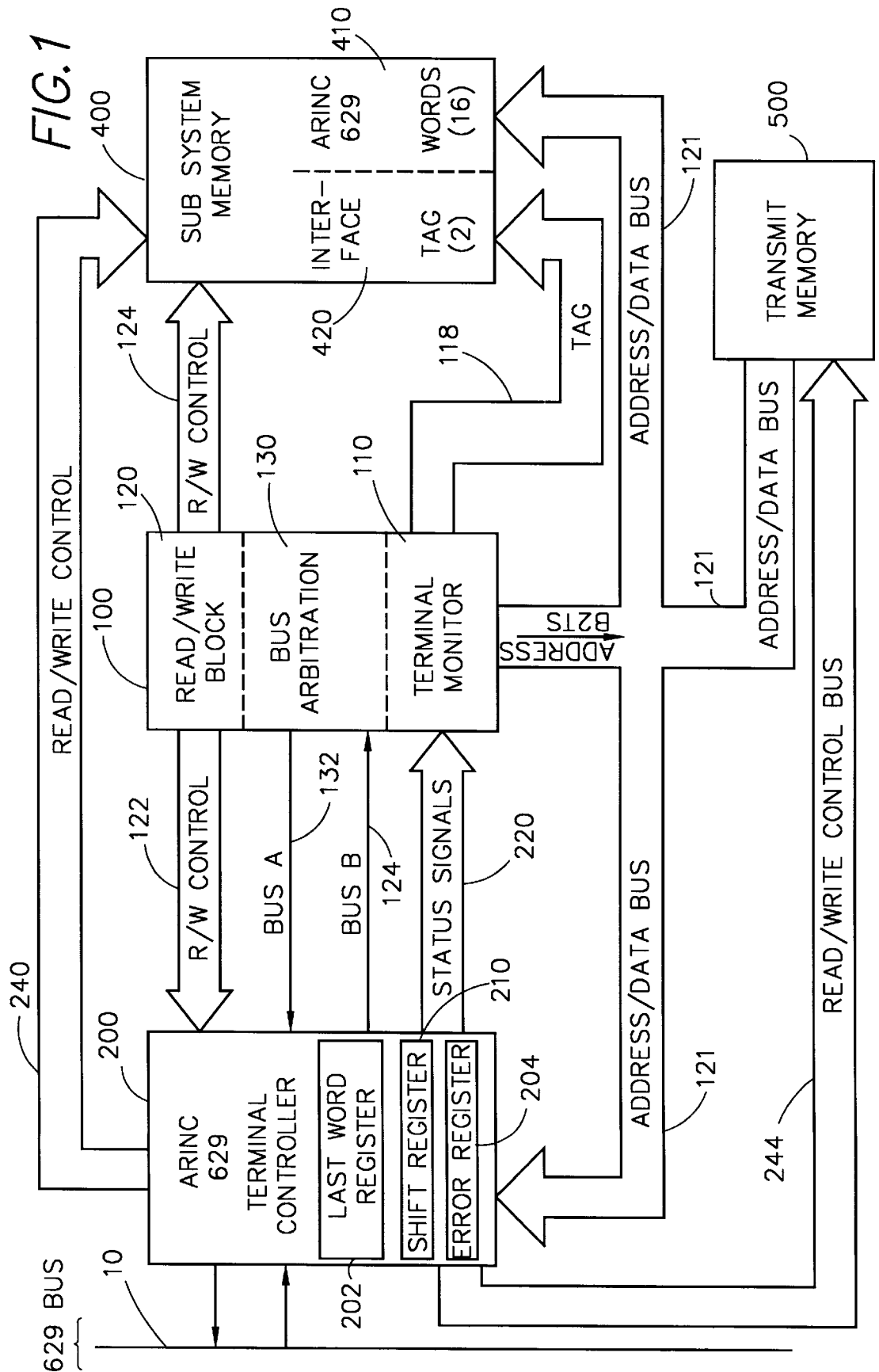
FIG. 1 is a block diagram of the present invention.

Shown in FIG. 1 is a block diagram of the memory interface system 100 of the present invention in combination with an ARINC 629 terminal controller 200 including last word register 202 and error register 204, an ARINC 629 bus 10, and subsystem memory 400.

Terminal controller 200 serves to receive data message transmitted on the bus 10, and transmit data messages stored in transmit memory 500 in accordance with the ARINC 629 Standard as published by in Boeing document, CAGE CODE 81205, CONTROLLED BY ARINC 629 DATA BUS (B-E82U), document D227W102, ARINC 629 TERMINAL CONTROLLER UNIVERSAL DATA SHEET, Revision C, Master Dated Apr. 20, 1993. The aforementioned document describes the physical and electrical characteristics of the Terminal Controller, regardless of the manufacturer. The AC and DC electrical characteristics contained therein are the worst case values for all the suppliers. This document has been created to remove the need of the designer to consult all the suppliers data sheets to determine the AC and DC characteristics envelope.

ARINC 629 is a multiple transmitter, broadcast-type, autonomous terminal access, time-division multiplex system that supports quasi-real time data communication between many terminals over a common single-channel transmission medium. One ARINC 629 Terminal Controller with its accessory components forms a two-way interface between the single channel (serial) medium and one or several (parallel) data ports of local subsystems.

The Terminal Controller is a VLSI device contained in a 180-pin pin grid array package. It provides an interface to and from a global ARINC 629 serial data bus and a parallel 16-bit wide subsystem bus. Typically the Terminal Controller is connected to the serial medium by means of line driver/receiver components, gets access protocol parameters from groundstraps, and task-specific parameters from PROMs. The subsystem interface takes the form most suitable for the specific application in question.

In its primary mode, the Terminal Controller operates as a digital autonomous access controller/transceiver. Transmission is enabled through a series of access timers, two of which have global values, and the third is specific for each Terminal Controller on the serial data bus. Data is sent on the bus using Manchester II Biphase coding at two megabit per second (Mps). A label word precedes each string of data words to identify the data. The receiver functions both as a transmission monitor and global bus receiver. In the monitor mode, the receiver prevents the Terminal Controller from transmitting outside of its unique access timeslot. The receiver function monitors the bus at all times when the Terminal Controller is not transmitting, listening for a match with parameters stored in its Receive Personality PROM (RPP). The receiver decodes each incoming label and determines if the information following it is required by the attached user(s). If a match is detected, the serial data is captured and sent to the subsystem for data storage.

The terminal controller 200 includes the last word monitor, or simply the last word internal register 202. The last word register 202 contains the last label or data word sent for a transmit operation, or the last label word received for a receive operation, but does not store received data words from the received data message during the receive operation. The last word register 202 allows for wrap-around verification of transmitted data and recovery of the label word from received data.

It should be noted that terminal controller 200 includes a non-accessible serial to parallel shift register 210 for placing the received data words autonomously on the address/data bus and control an external memory by read write control lines 240, and autonomously accesses the transmit memory data on address/data bus 120 through read/write control bus 244 connected to transmit memory 500.

The terminal controller 200 further includes an Interrupt Vector Register (IVR) which contains the fifteen bit interrupt vector for the current received or transmitted word string. The most significant bit of the IVR contains the string error bit. The IVR makes available to a subsystem the value of the current interrupt vector at any time whether or not the personality proms (RPP or XPP) have been programmed to provide interrupt vector strobes.

The terminal controller 200 also includes the Error Register 204 which contains not only error information but other diagnostic information as well. All but four of the sixteen bits conform to a "latch and hold" arrangement in which errors are latched as they occur and held until the Error Register is read. Following a read, these errors are zeroed. The "latch and hold" error information cannot change while the error register is being read. Any errors that occur following DSO being asserted will be reflected in the next error register access. It should be noted that these twelve "latch and hold" bits provide an error history rather than transient error status. The additional four bits are not latched and reflect the current status of the Terminal Controller.

In accordance with the present invention, subsystem memory 400 is a FIFO (first-in, first-out) 18 bit memory device. The 18 bit FIFO memory device 400 is allocated such each memory byte has 16 data bits dedicated for the ARINC 629 data output bus lines, indicated by numeral designation 410, and 2 bits dedicated as tag bits, indicated by numeral designation 420.

The function of memory interface system 100 is to read the last word register 202 of the terminal controller 200 for storing label words and data words, including transmitted data words into the subsystem memory 400, and also reading the error register 204 of the terminal controller for storing the error register word in the subsystem memory 400. Further, memory interface system 100 appends tag bits to all words written into the subsystem memory 400 to identify them as label words, data words, or error words. The memory interface system 100 cooperates with input/output control signals of the terminal controller 200 and subsystem memory 400 for arbitrating the address/data bus connected therebetween.

Memory interface system 100 includes three functional blocks as depicted by the terminal monitor block 110, the read/write control block 120, and the bus arbitration block 130. Terminal monitor block 110 provides signal monitoring of terminal controller status signals 220, read/write control block 120 provides read/write control signals 122 for controlling terminal controller 200, and read/write control signals 124 for controlling subsystem memory 400.

The terminal monitor block 110 receives outputs from the terminal controller 200 to perform three functions. The first is to determine when the terminal controller 200 contains data desired by the subsystem. If necessary the address/data bus 121 will be requested so that the read/write block 120 may facilitate reading the last word register 202 and transfer the data to the subsystem memory 400. The second function of the terminal monitor block 110 is to determine the appropriate tag that is to be appended to words written into the subsystem memory 400. The last function is to set the address of the appropriate terminal controller 200 registers, i.e., last word register 202 and error register 204, to be read by the read/write block.

The bus arbitration block 130 grants temporary control of the address/data bus 121 to the terminal controller 200 or the memory interface system 100, and prevents contention therebetween. The Bus arbitration block 130 responds to requests for the bus 121 received from the terminal controller 200 and the terminal monitor block 110. Both must request the bus for each bus cycle required. Each bus request must be removed before the next request is granted. When the terminal monitor block 110 request the bus, the bus arbitration block sends an acknowledge to the read/write block 120 to begin a cycle.

The read/write block 120 receives an acknowledge from the bus arbitration block 130 to begin a read/write cycle. Then label words, wrap-around data words, and error register contents may be strobed out of the last word register 202 of terminal controller 200, and written into the subsystem memory 400 with the appropriate tag appended thereto.

The following is general list of signals and their description which may be employed in one form or another for practicing the invention:

STATUS SIGNAL INPUTS, Inputs
C8MHz
The C8MHZ input is an 8 MHz clock used to clock the EPLD. It is synchronous to the TC clocks.
STAC
The STAC input from the TC is used by the terminal monitor block to indicate that data (including wrap-around data) is being received or that the Error Register should be read. This signal is also used to determine tag bits and internal register address bits. (active low)

The string active signal, STAC, is low for the duration of the Terminal Controller/subsystem bus activity in a word string for both receive and transmit operations. Again, the exception to this rule is that STAC will also go low for a label-only word string. It goes low just after a leading interrupt vector strobe and high just after a trailing interrupt vector strobe. Therefore, it can be used to distinguish between leading and trailing interrupts. STAC always goes low at the same time relative to the transmit/receive word, but is reset depending upon the end of the DMA sequence. All timing diagrams were drawn to show latest STAC reset. The timing relationship of STAC to the transmitted/received word string is detailed in FIGS. 3A–3D.

This signal can also be used to prevent data slicing of the transmitted/received word string by the host. When low, the signal indicates to the host that the data in memory is being transmitted or received. The preserve string coherency, STAC would be used to prevent the host from reading or writing the data block until the transmission/reception is completed.

RIVS

The RIVS input from the TC is used by the terminal monitor block to indicate that data is being received. This signal is also used to determine tag bits and internal register address bits. (active low)

This is a low active pulse that indicates to the host that the receive interrupt vector is valid on the AOF-0 lines. The relationship between the received word string and the leading and trailing interrupt vector strobes is illustrated in 3C–3D.

XIVS

The XIVS input from the TC is used by the terminal block monitor to indicate that wrap-around data is being received. This signal is also used to determine tag bits and internal register address bits. (active low)

Figure 3A:
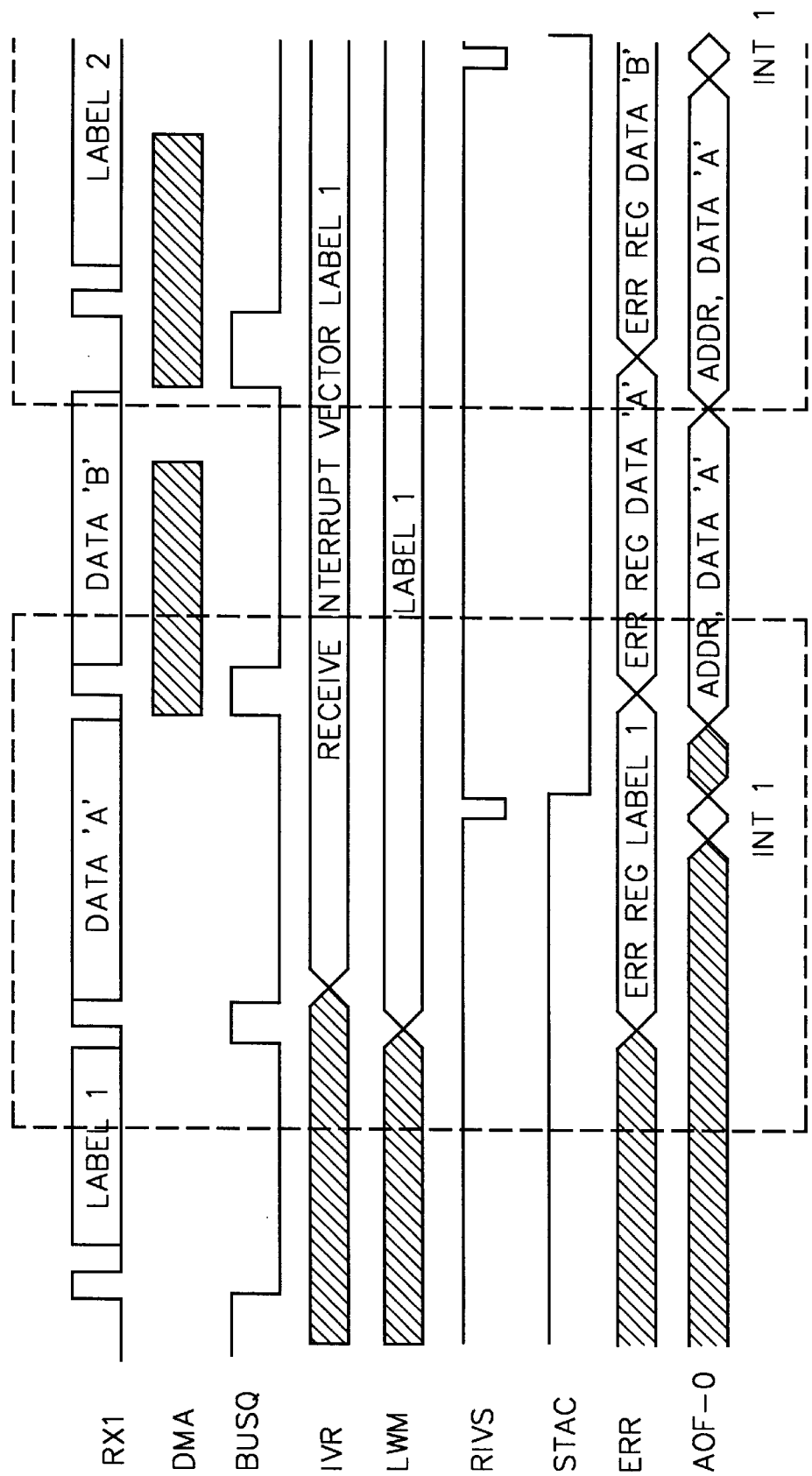
Figure 3C:
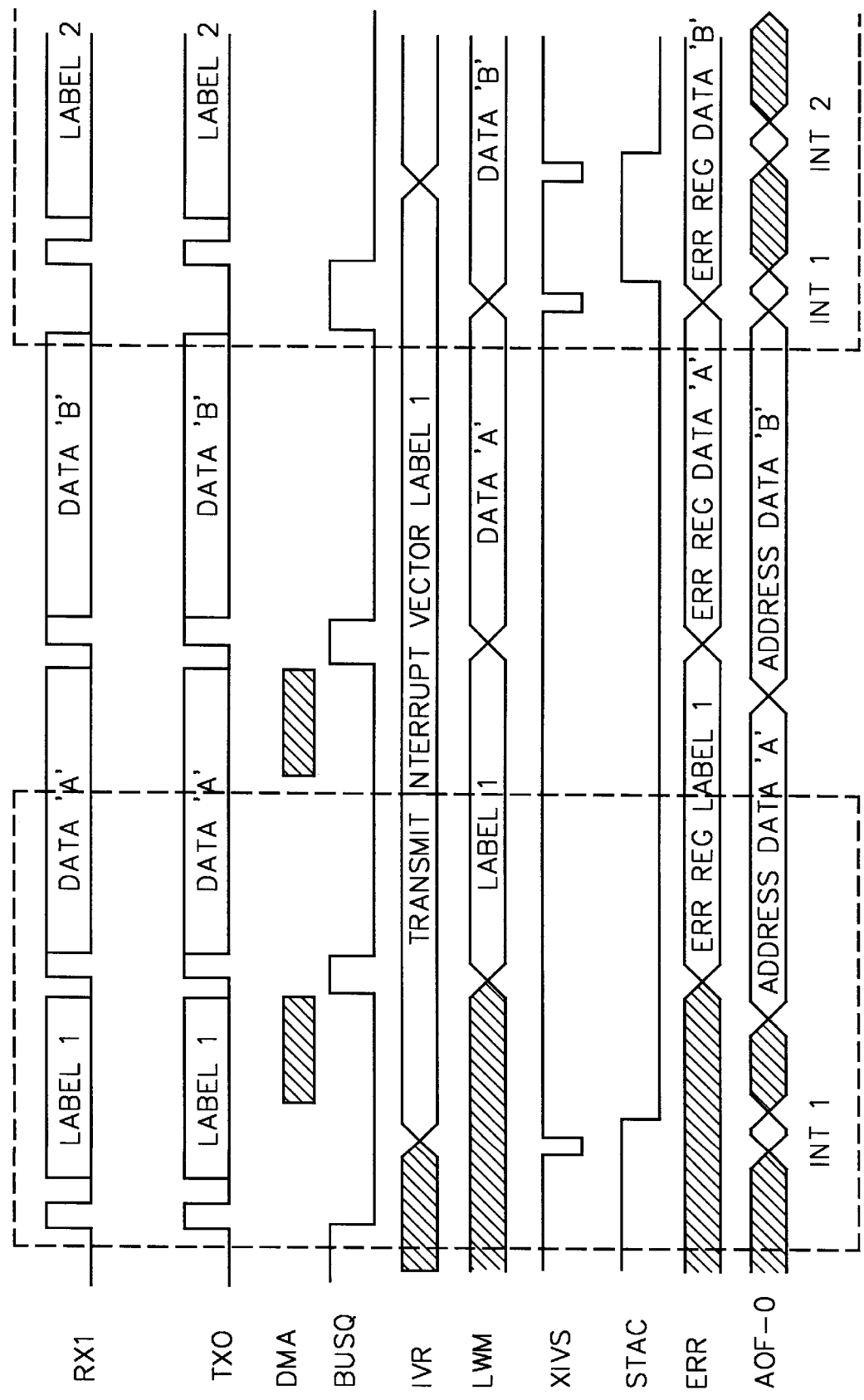
Figure 3D:
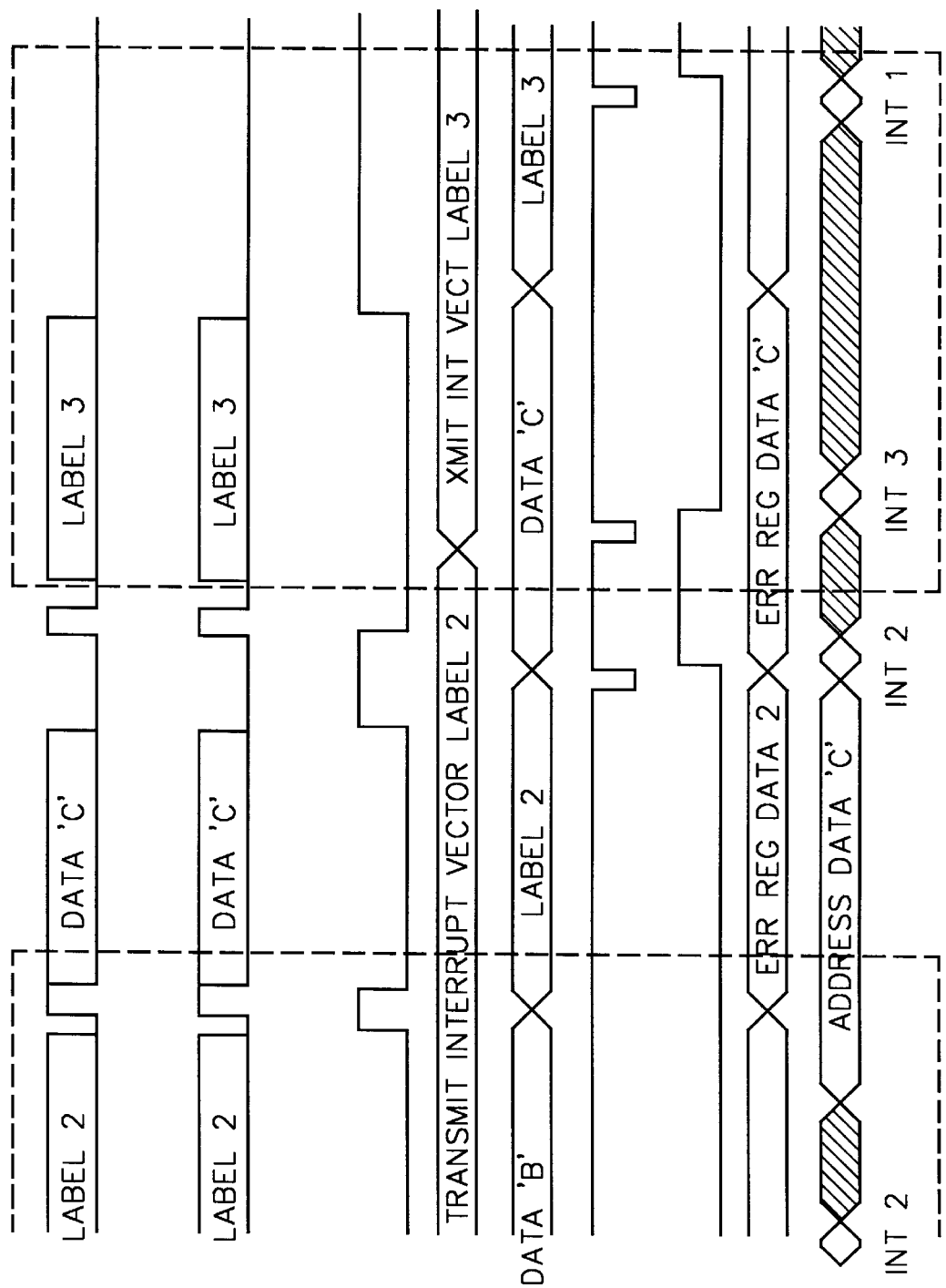

This is a low active pulse that indicates to the host that the transmit interrupt vector is valid on the AOF-0 lines. The relationship between the transmitted word string and the leading and trailing interrupt vector strobes is illustrated in FIGS. 3C–3D.

BUSQ

The BUSQ input from the TC is used by the terminal monitor to indicate that a word will be available in the Last Word Monitor Register. (active high)

This is a test/diagnostic signal that is defined as going active high when the Terminal Controller does not detect any activity on the Global ARINC 629 bus. In addition, the BUSQ goes high when the Terminal Controller detects a valid word in its decoder. BUSQ can be used to indicate when the internal registers contain valid data, as detailed in the timing diagrams FIGS. 3A–3D.

WAIT

The WAIT input from the TC is used by the terminal monitor block to extend the duration of the read cycle when reading the Last Word Monitor Register. (active low)

RWO

The RWO input from the TC is used by the read/write block to strobe receive data into the RX FIFOs. (read high/write low)

DSI

The DSI (DSO) input from the TC is used by the read/write block to strobe receive data into the RX FIFOs. (active low)

BUSR

The BUSR input from the TC is used by the bus arbitration block to grant bus control to the TC. (active low)

RX_RST

The RX_RST input is used to reset and initialize the LWM EPLD. (active low)

PAL1_RST

The PAL1_RST input is used to reset and initialize the LWM EPLD from external test equipment. (active low)

OUTPUT & INTERNAL SIGNALS

RESET

The RESET output generated by the terminal monitor block is used to initialize the LWM EPLD. (active high)

RX_IN_PROG

The RX_IN_PROG output generated by the terminal monitor indicates that data is being received and is used to determine tag bits and internal register address bits. (active high)

TX_IN_PROG

The TX_IN_PROG output generated by the terminal monitor block indicates that Wrap-around data is being received and is used to determine tag bits and internal register address bits. (active high)

RX_REQ

The RX_REQ output generated by the terminal monitor block is used to generate requests for the address/data bus to read labels and error registers for receive data. (active high)

TX_REQ

The TX_REQ output generated by the terminal monitor block is used to generate requests for the address/data bus to read labels and wrap-around data for transmitted data. (active high)

TX_REQ_RST

The TX_REQ_RST output generated by the terminal monitor block is used to reset the TX_REQ output after words have been read from the internal registers of the TC. (active high)

TX_REQ_DLY

The TX_REQ_DLY output generated by the terminal monitor block is the TX_REQ output delayed by a 1 microsecond to be sure data is valid in the internal registers of the TC. This output is used to generate requests for the address/data bus to read labels and wrap-around data for transmitted data. (active high)

DIV2

The DIV2 output generated by the terminal monitor block is used to delay the TX-REQ output. When enabled by TX-REQ the DIV2 output divides the 8 MHz by 2.

DIV4

The DIV4 output generated by the terminal monitor block is used to delay the TX_REQ output. The DIV4 output dives the DIV2 output by 2.

DIV8

The DIV8 output generated by the terminal monitor block is used to delay the TX_REQ output. The DIV8 output dives the DIV4 output by 2.

TX_ER_REQ

The TX_ER_REQ output generated by the terminal monitor block is used to generate requests for the address/data bus to read the error register after transmitted data has been written to the RX FIFOs. (active high)

TX_ER_RST

The TX_ER_RST output generated by the terminal monitor block is used to reset the TX_ER_REQ output after the error register has been read. (active high)

TER_DATA

The TER_DATA output generated by the terminal monitor block is used to enable the request to rad the error register. (active high)

RD_REQ

The RD_REQ output generated by the terminal monitor block is used to generate requests for the address/data bus to read labels, wrap-around data, and the error register for transmitted data. (active high)

AD17

The AD17 output generated by the terminal monitor block is one of two tag bits used to identify words written into the RX FIFOs as label, data or error register. (11=label, 01=data, 00=error register)

AD16

The AD16 output generated by the terminal monitor block is one of two tag bits used to identify words written into the RX FIFOs as label, data or error register. (11=label, 01=data, 00=error register)

AD1

The AD1 tristate output generated by the terminal monitor block is one of two address bits used to select the last word monitor register or the error register when reading data from the TC. (01=last word monitor register, 00=error register)

AD0

The AD0 tristate output generated by the terminal monitor block is one of two address bits used to select the last word monitor register or the error register when reading data from the TC. (01=last word monitor register, 00=error register)

AD0_EN

The AD0_EN output generated by the terminal monitor block is used to enable the tristate drivers for the AD1 and AD0 outputs when raiding data from the TC. (active high)

L_BUSR

The L_BUSR output generated by the bus arbitration block is used to determine when control of the address/data bus is to be granted to the TC. (active high)

BUSA

The BUSA output generated by the bus arbitration clock is used to grant control of the address/data bus to the TC. (active low)

RD_OUT

The RD_OUT output generated by the bus arbitration block is used to grant control of the address/data bus to read/write block of the LWM. (active high)

RD_$_{OUT}$_RST

The RD_OUT_RST output generated by the bus arbitration block is used to reset the RD_OUT output when control has been given to the TC.

CS

The CS output generated by the read/write block is used to enable access to the internal registers of the TC. (active low)

DLY_ASO

The DLY_ASO output generated by the read/write block is used to set up the ASO output during accesses to the internal registers of the TC. (active high)

ASO

The ASO output generated by the read/write block is used to validate address during accesses to the internal registers of the TC. (active low)

DLY_DSO

The DLY_DSO output generated by the read/write block is used to set up the DSO output during accesses to the internal registers of the TC. (active high)

DSO

The DSO output generated by the read/write block is used to strobe data out of the internal registers of the TC. (active low)

WR1

The WR1 output generated by the read/write block is used to strobe internal register data (labels, wrap-around data, and error register) and tag bits into the RX FIFOs. (active low)

WR_FIFO

The WR_FIFO output generated by the read/write block is used to strobe receive data and tag bits into the RX FIFOs. (active low)

CLR_ER

The CLR_ER output generated by the read/write block is used to clear the TX_ER_REQ output after the error register has been read. (active high)

CLR_READ

The CLR_READ output generated by the read/write block is used to clear the terminal monitor block after an internal register has been read. (active high)

Figure 2:
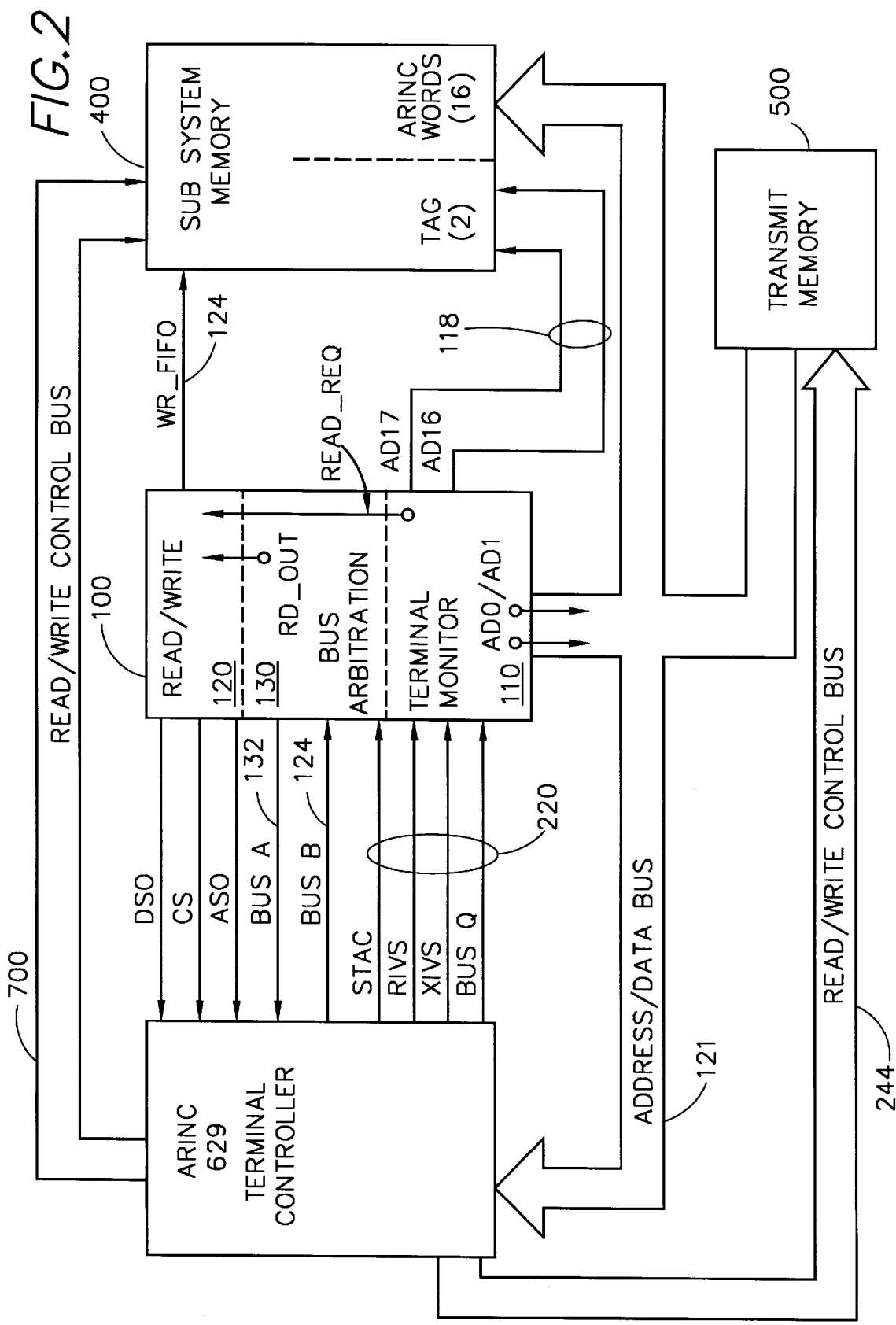
FIG. 2 is another block diagram of the present invention showing greater detail than FIG. 1.

Illustrated in FIG. 2 is a block diagram similar to FIG. 1 showing more particularly some of the aforementioned signal lines. FIGS. 3a and 3b are timing drawings illustrating the relationship of the terminal controller 200 status signals during receive mode and transmit mode, respectively.

Referring again to FIG. 1, transmit memory 500 is also coupled to address/data bus 121 and may be controlled by terminal controller 200 through read/write control lines bus 244; and similarly subsystem memory 400 may be controlled by terminal controller 200 through read/write control lines bus 240.

The general operation of the memory interface system 100 will now be described. During the receive mode, the first data word received is the label word, and is stored in the last word register 202. The terminal controller 200 puts out status signals 220 to initiate action by the memory interface system 100 to cause the contents of the last word register 202 to be placed on the address/data bus 121. At the same time, the tag bits are set such that when a write command is given by read/write block 120, the label word and label tag are stored in subsystem memory 400.

Continuing, the status signals will then dictate transfer of control to the terminal controller 200 to autonomously write data words into subsystem memory 400 through use of read/write control bus signal from terminal controller 200 to subsystem memory 400. However, before allowing this action to take place, the tag bits are set to indicate that words written in memory are data words of the received message.

When the status signals again indicate that the data message is complete, control is transferred back to the memory interface system 100, which in turn causes the error register to be read, transferred to the memory, and tag bits set and stored therewith.

In the transmit mode of terminal controller 200, terminal controller 200 autonomously addresses transmit memory 500 and allows the words therein to be transferred to the data bus 120 as inputs to terminal controller 200 for subsequent transmission to ARINC 629 bus. However, in this transmit mode all of the words are temporally stored in the last word register. Accordingly, memory interface system 100 acknowledges this situation and causes the last word register transferred to subsystem memory 400 along with the appropriate tag bits, including both the transmitted label word, as well as a reading of the error register including tag bits after the data message has been completed. This is the so called wrap-around mode for subsequent data comparison of that which was transmitted and which was stored, thereby providing a means for detection of any faults in the system.

In practice of the present invention, the memory interface system 100 including all of it functional blocks may be constructed by employment of an Erasable Programmable Logic Device, for example an ALTERA EP1810, or by a wide array of electrical circuit components to achieve the intended function of the memory interface system 100.

Figure 4A:
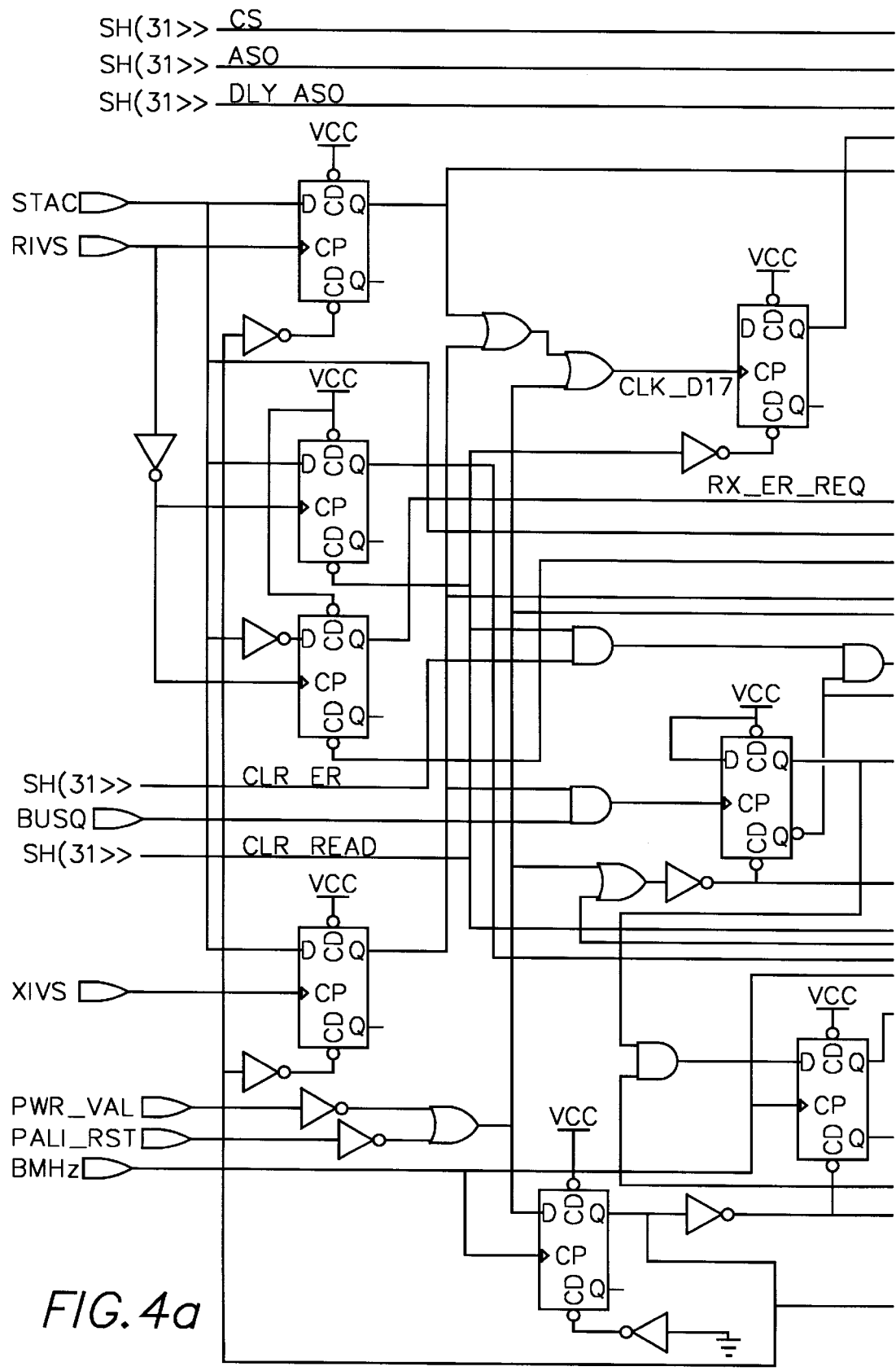
FIGS. 4A–4C are a schematic diagram illustrating an embodiment of a terminal monitor block.
Figure 4B:
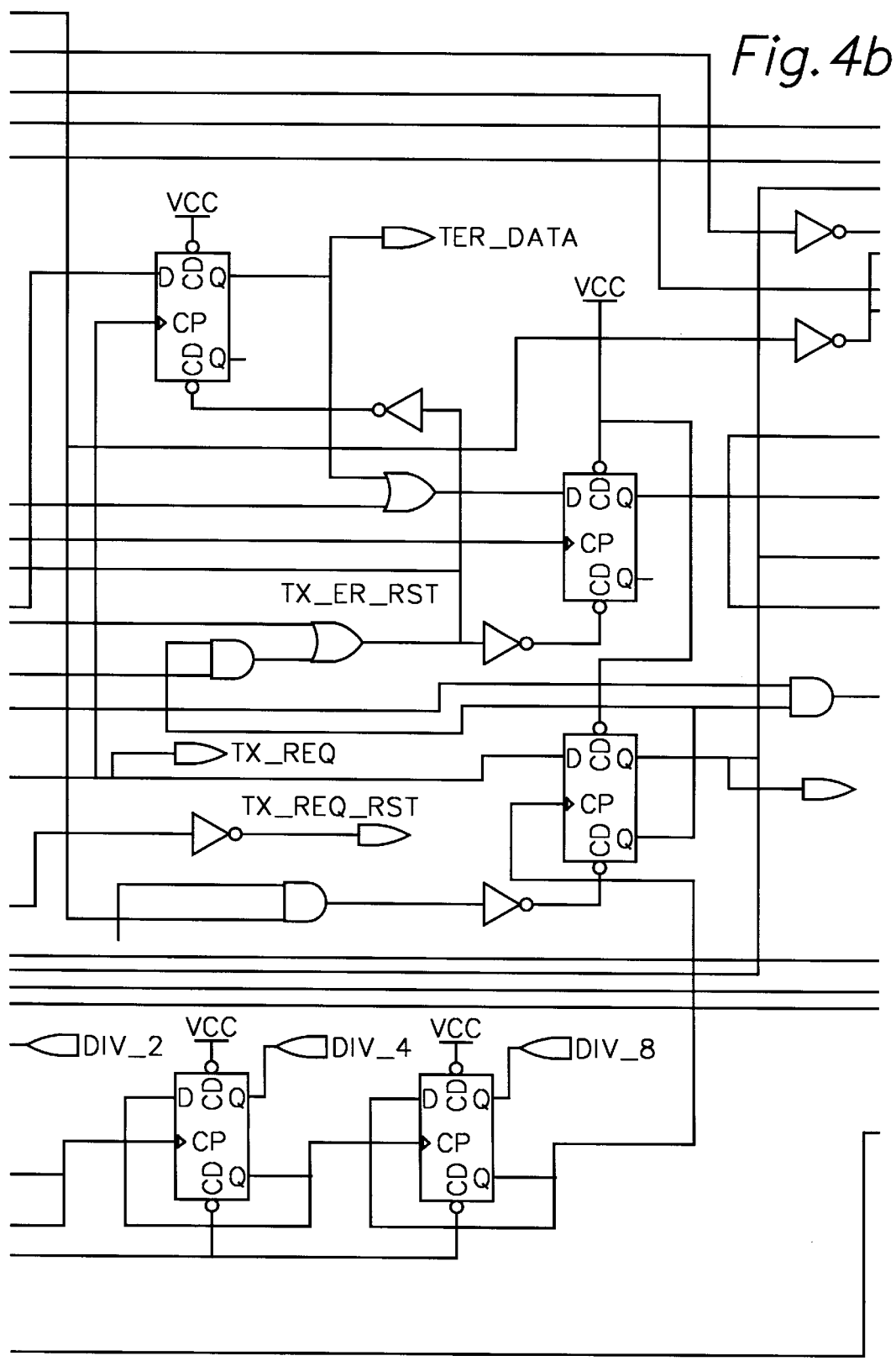
Figure 4C:
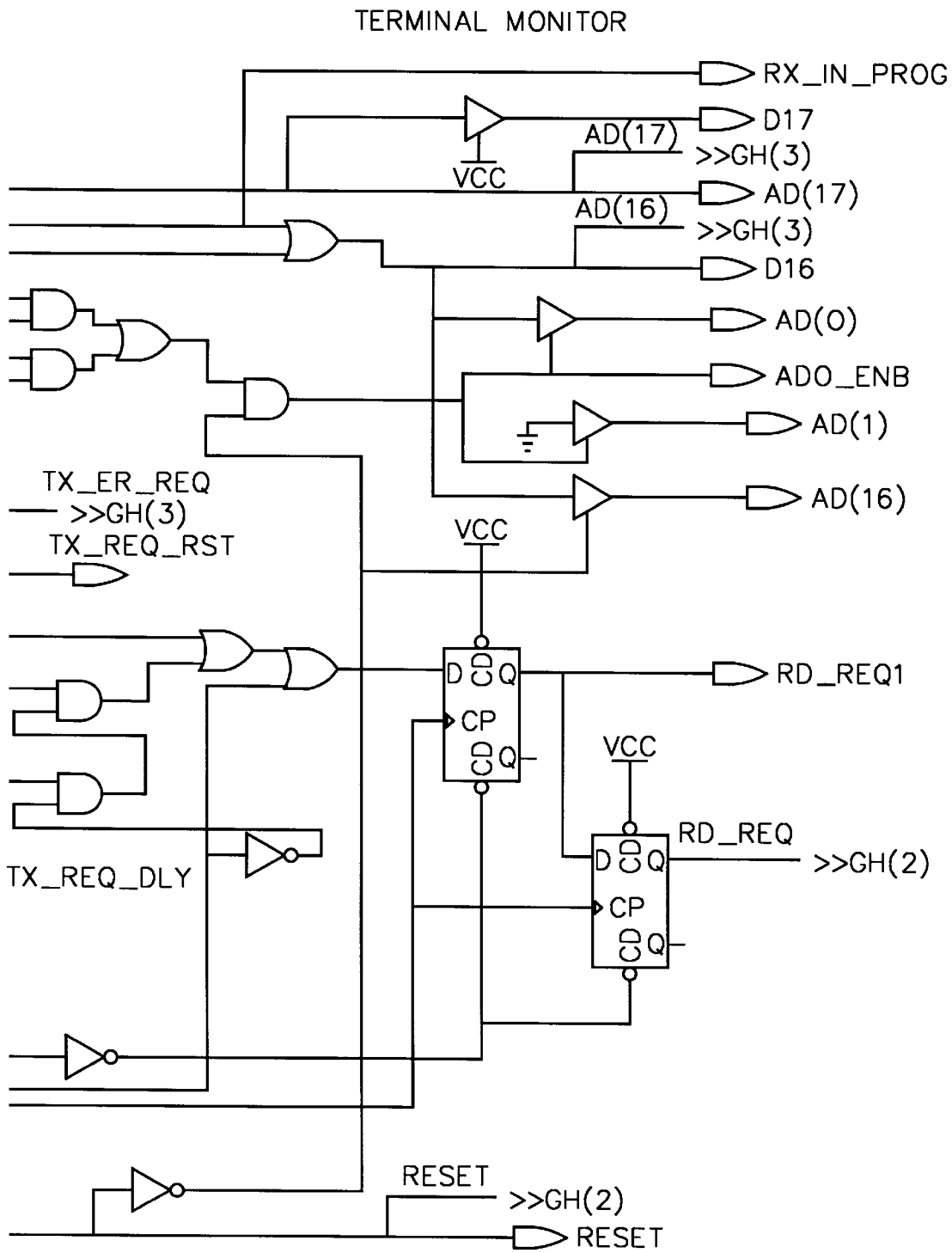
Figure 5B:
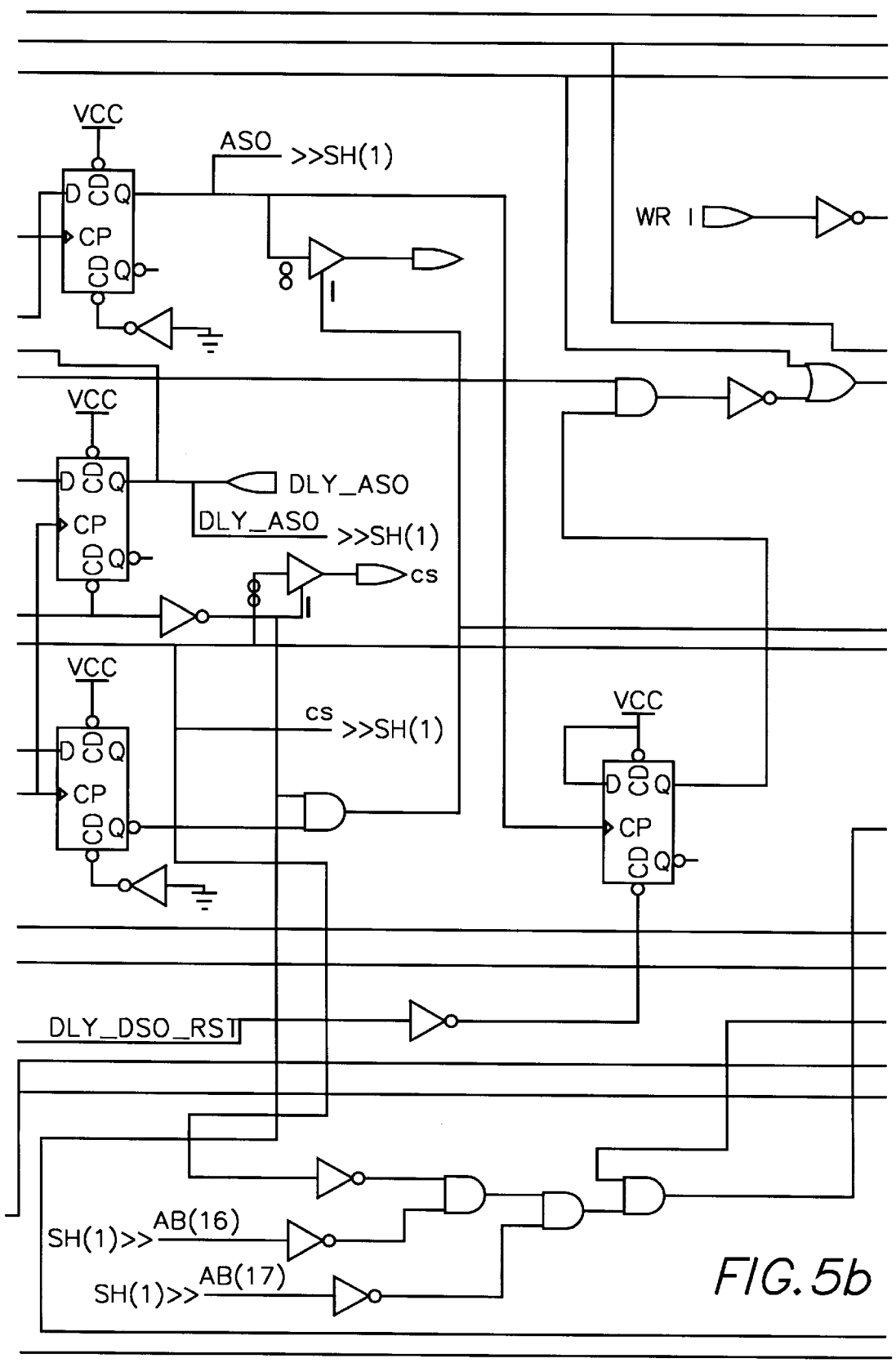
Figure 5C:
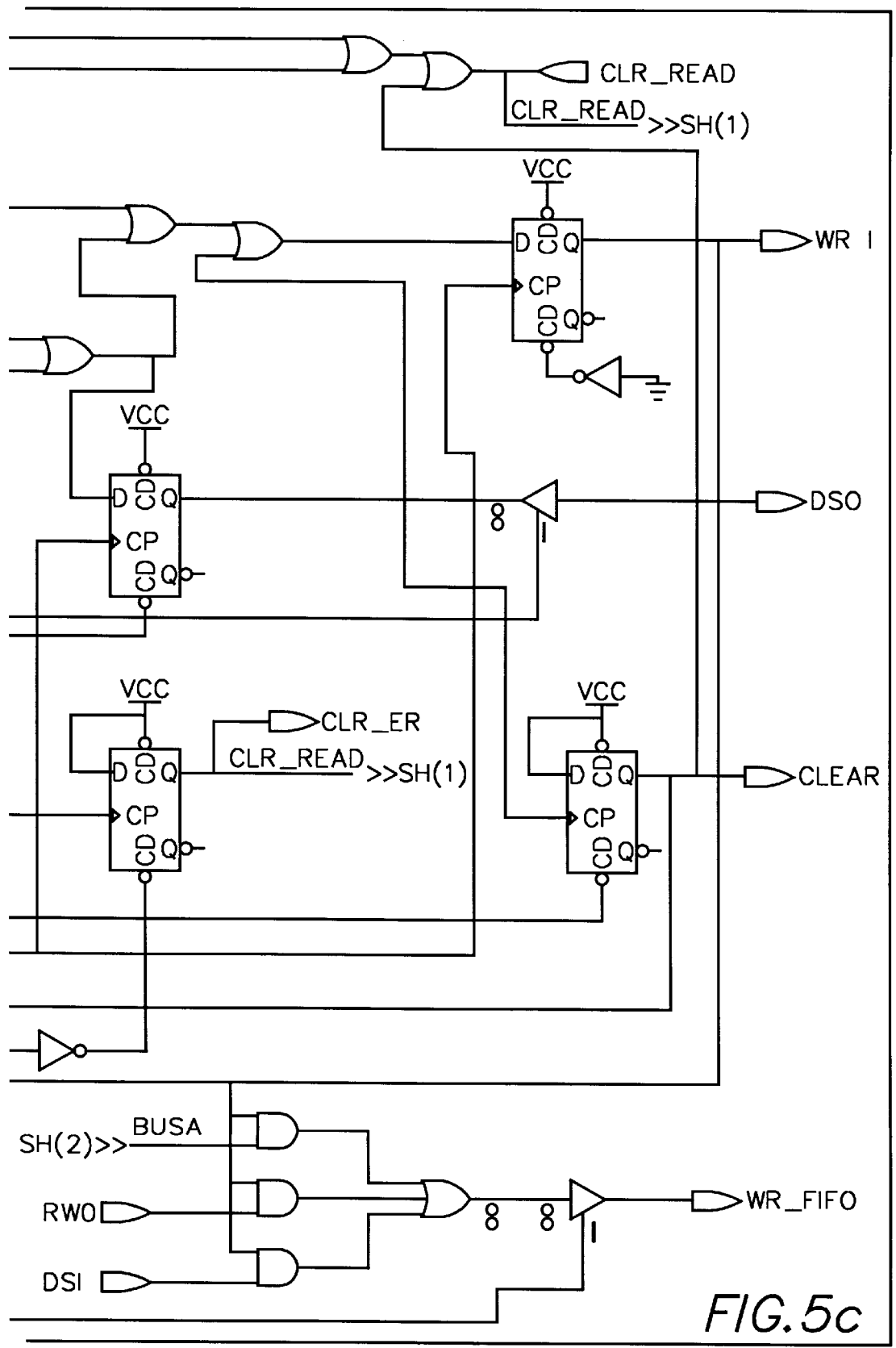
Figure 6:
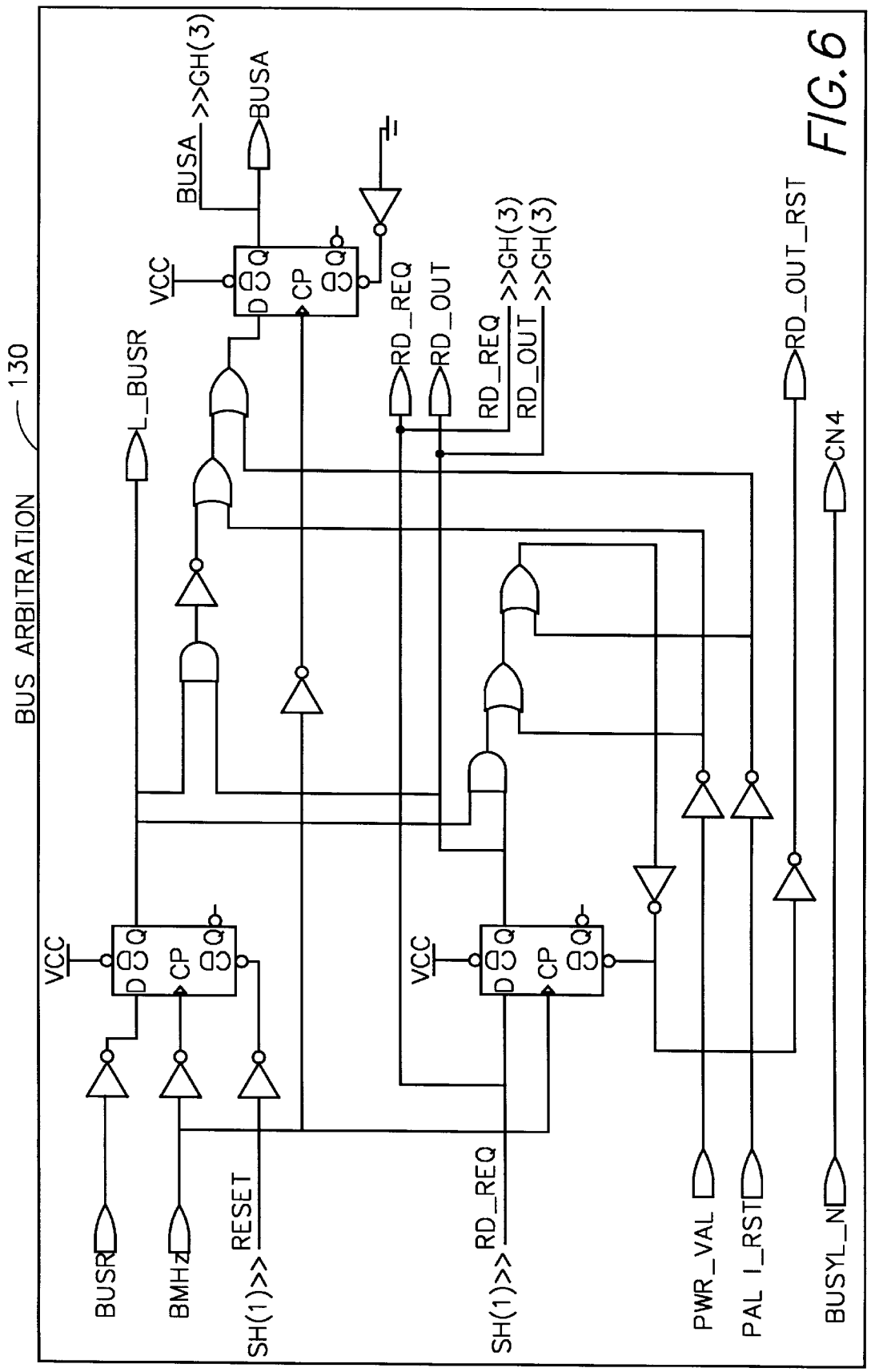
FIG. 6 is a schematic diagram illustrating an embodiment of a bus arbitration block.

FIGS. 4, 5, and 6 illustrate schematic circuit diagrams of the configuration of the Erasable Programmable Logic Device for achieving the terminal monitor block 110, the read/write block 120, and the bus arbitration block 130, respectively.

It should be recognized by those skilled in the art that circuit construction beyond that which has been disclosed herein is intended to be within the true spirit and scope of the present invention. Although a specific embodiment has been shown for multi-channel data receiver system in accordance with present invention, others are of course possible within the level of skill in the art, and are within the true spirit and scope of the present invention.

More specifically, the foregoing description has been set forth in terms of functional block diagrams including registers, counters, timers, and logic means, and also illustrated in terms of flow diagrams to enhance understanding of the present invention without burdening the reader with detail well known within the level of those skilled in the art. There are, of course, a wide array of implementations for achieving the intended function as depicted in the accompanying claims, all of which are intended to be within the true spirit and scope of the present invention. It should also be noted that although a specific embodiment has been illustrating specific memory devices, there are of course a wide array of components for serving the intended function. More specifically, FIFO memories may be implemented by an addressable random access memory. Lastly, although the embodiment of the invention has been illustrated, at least in part, by specific data transfer being serial or parallel, alternate arrangements are, of course, within the true spirit of the present invention is defined by the accompanying claims.

It should also be noted that all, or selected ones of any of the electrical circuit components may be configured into a single integrated circuit and that the separation of components as illustrated ion the Figures is within the true spirit of the present invention is defined by the accompanying claims.

We claim:

1. A memory interface system for use in an aircraft for directing storage of messages received from a plurality of aircraft subsystem over a data bus to a message word memory, comprising:

terminal controller means cooperating with said data bus and said message word memory for receiving and transmitting said messages, each of said messages including a label data word indicating from which system the message originated, at least one message data word, and one data word indicating any error and diagnostic information associated with the message; and interface means connected between the terminal controller and the message word memory wherein the interface means controls message movement between the terminal controller and the message word memory and provides a tag word for each of the data words in the message, said tag word identifying the corresponding type of data word in the message.

2. Apparatus according to claim 1 wherein the message word memory is a first-in-first out memory means which stores the messages along with the corresponding specific tag words.

* * * * *